though to be formed in the reaction may be removed by a simple distillation.

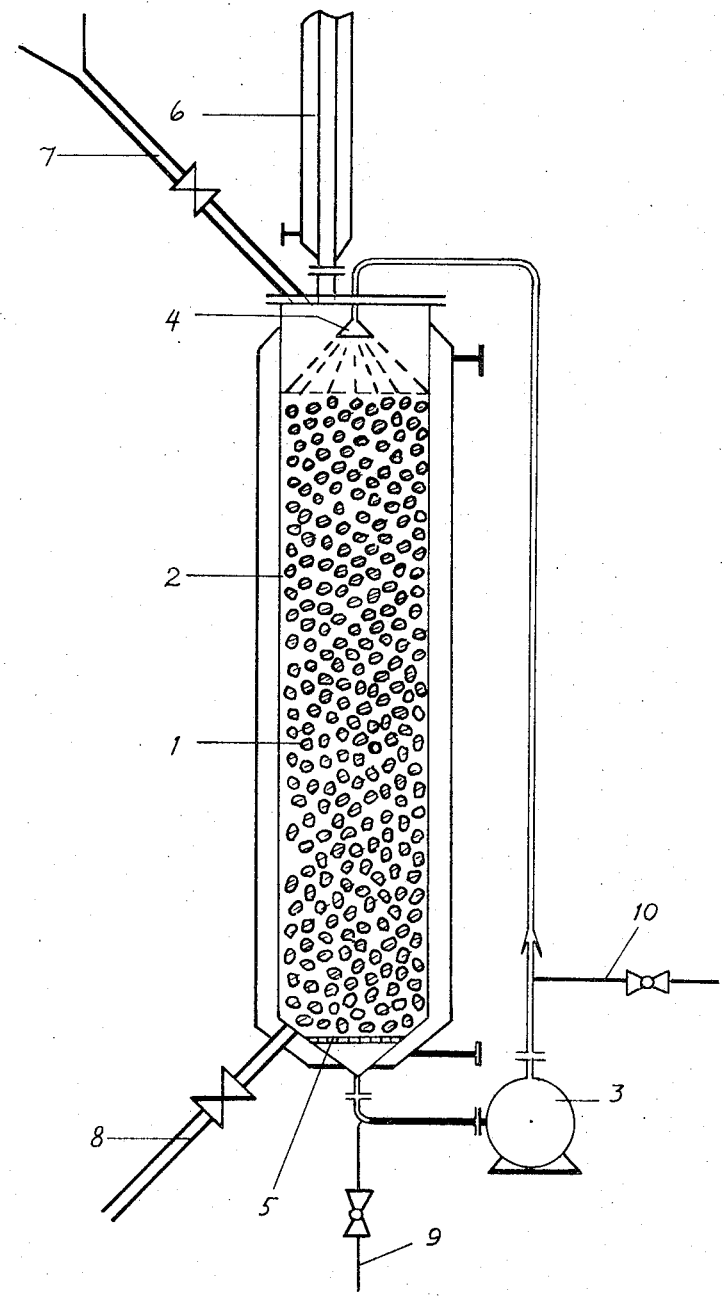

United States Patent Office 3,557,179
Patented Jan. 19, 1971

3,557,179
PREPARATION OF ORTHOSILICIC ACID TETRAMETHYL ESTERS
Arnold Lenz, Cologne-Stammheim, and Walter Rogler, Ranzel, Troisdorf, Germany, assignors to Dynamit Nobel Aktiengesellschaft, Troisdorf, Germany, a corporation of Germany
Continuation-in-part of application Ser. No. 762,673, Sept. 20, 1968. This application Apr. 29, 1969, Ser. No. 820,268
Claims priority, application Germany, May 2, 1968, 1,768,339
Int. Cl. C07f 7/04
U.S. Cl. 260—448.8                12 Claims

ABSTRACT OF THE DISCLOSURE

Process of preparing orthosilicic acid tetramethyl ester comprising reacting at least one of silicon, iron silicide and ferrosilicon with methanol in the presence of sodium, lithium, potassium, rubidium or cesium methylate as catalyst, at a temperature of from about 15° C. to the boiling point of the reaction mixture.

---

This application is a continuation-in-part of application Ser. No. 762,673, filed Sept. 20, 1968, now abandoned.

This invention relates to a process of preparing orthosilicic acid tetramethyl esters.

Alkyl orthosilicates and particularly orthosilicic acid tretramethyl esters constitute chemical intermediates of particular importance. For example, orthosilicic acid tetramethyl ester is used as a starting material in the preparation of silicic acid having an extremely great surface area. In the preparation of such silicic acid the orthosilicic acid tetramethyl ester is subjected to a hydrolytic cleavage while in the vapor state. In view of the particular importance of orthosilicic acid tetramethyl ester, a quick and convenient process of preparing the same is desirable.

Orthosilicic acid esters can be obtained by the reaction of silicon halides with the corresponding alcohols. In this known reaction, the corresponding hydrogen halide is formed as a by-product. This hydrogen halide initiates a great number of secondary reactions and ultimately leads to a considerable yield of by-products, which include water, organic halogen compounds and, particularly, polymeric silicic acid esters. The yields in such processes are accordingly very poor. Further because of the production of the hydrogen halide, the material from which the reaction equipment is constructed has to meet severe requirements.

According to another known process, alkyl orthosilicates are prepared from silicon and the alcohols concerned using a copper-silicon catalyst. However, as silicon is extremely inert, only small yields are obtained, the same amounting to no more than 40%, for example, in the synthesis of orthosilicic acid tetramethyl ester. Furthermore, generally high temperatures of up to 450° C. have to be used in this known process.

According to still another prior-art process, the silicic acid esters, particularly those prepared on the basis of ethanol and higher alcohols, can be prepared directly from silicon and the corresponding alcohols, by reacting the starting material at an elevated temperature, preferably under elevated pressure, and under the action of a catalyst. In this procedure the silicon must b subjected to a grinding process during the reaction so as to constantly expose fresh surfaces thereof. Suitable catalysts are alkaline materials such as sodium ethylate, potassium hydroxide, ammonium bifluoride, ammonia and dicyanodiamide. Sodium methylate has not been mentioned as a suitable catalyst for this procedure.

It is one object of the present invention to provide a process for preparing orthosilicic acid tetramethyl esters which can be effected with good results.

Another object of the invention is to provide a process for preparing orthosilicic acid tetramethyl esters which can be carried out at low temperatures and in the absence of pressure.

A further object of the invention is to provide a process of preparing orthosilicic acid tetramethyl esters without the necessity of having to mechanically treat the silicon reactant during the process.

Still further objects will become apparent from the following description taking in conjunction with the accompanying drawing, showing one embodiment of an apparatus for carrying out the process of the invention.

The above objects are attained in accordance with the present invention by reacting at least one member of the group consisting of silicon, iron silicide and ferrosilicon with methanol in the presence of one of potassium, cesium, rubidium or sodium methylate as alkaline catalyst at a temperature of from about 15° C. up to the boiling point of the reaction mixture, and preferably at normal pressure. The reaction proceeds according to the following chemical equation:

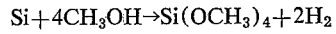

$$Si + 4CH_3OH \rightarrow Si(OCH_3)_4 + 2H_2$$

In the process of the invention, it is readily possible to follow the course of the reaction by means of the amount of hydrogen that is evolved therein.

It is also possible in accordance with the invention to proceed by introducing into the reaction, not the alkali metal methylate for example, sodium methylate, but materials which combine with the methanol in the reaction mixture to form the alkali metal methylate, for example, sodium methylate prior to or during the formation of the silicic acid esters. If, for example, sodium is introduced into the reaction mixture, the formation of sodium methylate takes place very quickly.

The concentration of the alkali metal methylate in the methanol present in the reaction mixture determines the speed of the reaction. A satisfactory reduction rate is achieved when a layer 5 microns thick of the solid silicon containing starting material is brought to reaction. Alkali metal methylate concentrations of from about 5 to 38% of the weight of the solution have proven to be suitable in the reaction.

In the process according to the invention it is unnecessary to use high temperatures and pressures. In most cases the reaction is carried out under reflux, in connection with which reaction temperatures develop which are generally only slightly above 70° C., or amount to at the most about 100° C. It is not necessary to provide a sealed reaction system, i.e., the reaction can be generally carried at normal pressure.

The advantages over prior-art processes for the preparation of orthosilicic acid tetramethyl ester are the very high yield and the high speed of reaction under these technically very advantageous conditions.

The excellent results realized with the process of the invention are to be considered especially surprising because an analogous process using ethanol and sodium ethylate cannot be carried out.

In the process of the invention, the yield of ester and the speed of reaction also depend to a great degree on the purity of the starting materials. In particular, the methanol must be as free as possible from water. Since technical methanol always contains traces of water, this water should be bound, e.g., by the addition of sodium methylate or orthosilicic acid tetramethyl ester thereto before starting the reaction. The small amounts of by-products which are thereby formed, such as NaOH, sodium silicate or polymeric silicic acid esters, do not interfere with the ester formation. If, however, the methanol is not sufficiently dehydrated, the silicon reactant becomes greatly passivated soon after the reaction commences due to the formation of hydrates on the surface of the silicon particles.

The silicon, iron silicide or ferrosilicon are added in granular or powder form. The speed of reaction can be regulated not only the alkali metal methylate concentration but also by the size of the surface of the solid reactant, i.e., by the grain size.

Ferrosilicon having a content of about 33 to 99% by weight of silicon has proven particularly well suited for use in the process according to the invention. The lower value, i.e., 33% corresponds approximately to the proportions in iron silicide.

Iron-silicon alloys containing less than about 33% silicon are, however, not suitable as starting materials in the instant process.

In many cases, especially when a very fine silicon or ferrosilicon powder is used, it is sufficient if the reaction mixture is stirred during the reaction. If, however, a coarsely granular material is used, a modified procedure, which will be explained with the aid of the drawing is advantageously followed.

Thus in accordance with the invention, there is provided a process of preparing orthosilicic acid tetramethyl ester by reacting at least one of silicon, iron silicide, and ferrosilicon with methanol in the presence of an alkali metal methylate as catalyst, at a temperature of from about 15° C. to the boiling point of the reaction mixture.

In addition to sodium methylate, lithium and potassium methylate can be advantageously used. Rubidium and cesium methylate can also be used, but because of the higher costs associated therewith, sodium, lithium and potassium methylate are preferred. It is also possible to employ mixtures of any of them to great advantage.

Referring to the drawing the silicon granulate 1 is introduced into an elongated, upright container 2, which can be heated. The methanol-methylate mixture is circulated by pump 3, and reintroduced into the container 2 through a spout 4. A screen floor 5 prevents the silicon particles from getting into the circulation conduits or into the pump. The hydrogen produced during the reaction is carried off through the reflux condenser 6. The system also contains a feeding system 7, which can be equipped with cooling means if desired, and a discharge outlet 8 for the solid material. Furthermore, sludge can be removed through conduit 9, and catalyst solution or methanol can be added via conduit 10. Basically, these liquids can also be charged via the feeding system 7. In the procedure as carried out in the system represented in the drawing, the speed of reaction is controlled by the rate of circulation of the liquid in addition to the concentration of methylate.

In those instances where the ferrosilicon granulate is a relatively slow-reacting and coarsely granular material, the procedure as just described can be further modified as follows:

The screen floor 5 is omitted and a pump is inserted of the type that is used, for example, for pumping sludges or crystal suspensions. In a modified installation of this kind it is possible to circulate the entire reaction mixture. The grating contact and mechanical stressing of the granular product while it is being circulated, and particularly in the pump, results in a comminution of the ferrosilicon particles in the course of the reaction, which of course, contributes towards an acceleration of the speed of reaction. If the entire reaction mixture is circulated, a tangential return of same into the upper part of the reaction vessel 2 has proven advantageous. In this manner a further mechanical stressing of the inherently soft particles is produced, and consequently a comminution of same.

The process can be performed both batch-wise and continuously. In the continuous procedure, condensate is constantly removed, for example, through the condenser, and is delivered to a distillation system. On the other hand, the siliceous solid material or silicon and the methanol are replenished, some of the methanol being recycled from the distillation system.

A more complete understanding of the procedure of this invention may be had by reference to the following illustrative examples which are presented for illustration and not for purposes of limitation. This invention is not limited to the exact details shown and described for obviously different procedures and different installations, whereby liquids are brought to reaction with solids with the evolution of gases, can be used for the preparation of orthosilicic acid tetramethyl ester according to the invention.

EXAMPLE 1

In a one-liter vessel provided with an agitator and a reflux condenser, 1 kg. of a solution of 38% sodium methylate in methanol was added to 50 kg. of a finely granulated ferrosilicon containing 90% silicon by weight (grain diameter approx. 10 microns). The evolution of hydrogen began at room temperature and increased as the temperature rose to about 100° C. During the reaction a maximum of 200 l. of hydrogen per hour was discharged. In the course of the reaction, however, the evolution of gas slowly decreased and towards the end of the reaction a total of 195 g. of methanol had to be added so as to prevent the methylate from crystallizing out. After 2 hours the ester formation was substantially completed. The ester-methanol mixture was then distilled and analyzed. The 850 g. of liquid produced in the distillation contained 27 wt.-percent $Si(OCH_3)_4$. The yield of orthosilicic acid tetramethyl ester with respect to the 95% reacted silicon amounted to 100%, and the total yield with respect to silicon was therefore 95%.

EXAMPLE 2

The same procedure was followed as set out in Example 1, with the exception that a 15% methylate solution was used. The hourly $H_2$ evolution amounted to a maximum of 20 l. It decreased, however, in the course of the reaction. After 4 hours 886 g. of ester-methanol mixture was separated. The conversion with respect to the silicon charged amounted to 95%. In this example, it was not necessary to add any methanol towards the end of the reaction, since the saturation point of the methylate solution was not exceeded when it was cooled down to room temperature.

EXAMPLE 3

The same procedure was followed as in Example 1, excepting that in this case a coarsely granular ferrosilicon (90 wt.-percent silicon) was used having an average grain diameter of about 1 cm. During the reaction which was carried out under reflux a temperature of about 100° C. developed. The production of hydrogen amounted to a maximum of 240 ml./hr. corresponding to an hourly consumption of only 0.15 g. of silicon. Towards the end of the reaction, 195 g. of methanol was added. After a total of 280 hours, the ester-methanol mixture was distilled off. The 840 g. of liquid which were thereby obtained contained 26.5 wt.-percent $Si(OCH_3)_4$. This corresponded to a conversion of 92% with reference to the silicon input. Substantially 100% of the conversion was to the desired ester.

A technically improved reaction was achieved by treating the described coarsely granular material in an installation of the kind described in the drawing. The installation as used, however, did not have a screen bottom 5, and a sludge pump was substituted for pump 3. Thus it was possible to circulate the entire reaction mixture including the ferrosilicon granulate, and to increase the speed of reaction to such an extent that an hourly maximum of about 150 l. of hydrogen was produced. The total reaction time amounted to only about 3 hours, and a conversion of 92% was realized with respect to the silicon input.

EXAMPLE 4

(A) 196 g. of ferrosilicon (containing 90% Si) were ground with 404 g. of methanol (molar ratio 1:2) for 30 hours in a ball mill to provide a particle size of about 10 microns. The resulting suspension was poured into a one-liter vessel equipped with an agitator. The vessel was cooled while 248 g. of sodium methylate was introduced therein. There was thusly formed a 38% solution of methylate in methanol. The mixture was then refluxed, while a strong evolution of hydrogen occurred. After 20 minutes, the reaction had been completed. 478 g. of an ester-methanol mixture was then separated off. Analysis showed an $Si(OCH_3)_4$ content of 98%. The yield amounted to 98% with respect to the methanol (49% with respect to the Si). The yield per unit of volume per unit of time amounted to 4420 g./cu. ft./hr.

(B) In another run, the same procedure was followed as under (A), with the exception that ammonia was used as the catalyst instead of sodium methylate. For this purpose, the mixture was refluxed with agitation while introducing an excess of $NH_3$. A slight evolution of $H_2$ developed. After 5.5 hours of operating time, 402 g. of an ester-methanol mixture was separated off. Analysis showed an $Si(OCH_3)_4$ content of 99%. The yield amounted to 0.83% with respect to the methanol (0.42 with respect to Si). The yield per unit of volume per unit of time amounted to 20.5 g. per cubic foot per hour.

EXAMPLE 5

(A) A silicon-methanol suspension was prepared as in Example 4 and poured into a one-liter autoclave provided with an agitator. 248 g. of sodium methylate was then added, with cooling, thereby producing a 38% methylate-methanol solution. The autoclave was sealed and heated to 160° C., while the pressure rose spontaneously to 280 atmospheres. After 10 minutes of operating time, constant pressure was reached and the autoclave was cooled and depressurized. 475 g. of an ester-methanol mixture were removed. Analysis sohwed an $Si(OCH_3)_4$ content of 98.5%. The yield amounted to 97.5% with respect to the alcohol (49% with respect to Si), and the yield per unit of volume per unit of time was 7950 grams per cubic foot per hour.

(B) In another run, the same procedure was followed as under (A), excepting that $NH_3$ was used instead of sodium methylate as the catalyst. Accordingly, the suspension in the one-liter autoclave was saturated with $NH_3$ under 1 atmosphere gauge pressure. The temperature was increased to 160° C., whereupon the pressure rose to 170 atmospheres gauge pressure within 5.5 hours of operating time. After cooling the vessel was depressurized and 440 g. of an ester-methanol mixture were drawn off. Analysis showed an $Si(OCH_3)_4$ content of 58.6%. The yield amounted to 54% with reference to the methanol (27% with reference to the silicon), and the yield per unit of volume per unit of time was 1330 g. cu. ft./hr.

EXAMPLE 6

In a one-liter vessel provided with an agitator and a reflux condenser 1 kg. of a solution of 38% sodium methylate in methanol was added to 50 g. of a finely granulated iron silicide containing 50% silicon by weight (grain diameter 10 microns).

In heating the mixture to the reflux temperature (approx. 100° C.), there developed small quantities of hydrogen increasing to approximately 40 l./h. During the reaction a total of 60 g. of methanol had to be added to prevent the methylate from crystallizing out.

Before the reaction was substantially completed the evolution of hydrogen lessened considerably. The reaction itself was completed after two hours.

The ester-methanol mixture was then distilled and analyzed.

685 g. of the liquid produced in this distillation contained 9.5 wt.-percent $Si(OCH_3)_4$. The total yield with respect to silicon was therefore 48%.

EXAMPLE 7

The same procedure was followed as in Example 1, excepting that in this case 30 g. of iron silicide (50 wt.-percent Si, grain diameter 10 microns) and 20 g. silicon (98 wt.-percent Si, grain diameter 10 microns) were added.

The mixture was heated up to reflux temperature whereby hydrogen of 130 l./h. were released.

During the reaction 125 g. methanol had to be added to prevent the sodium methylate from crystallizing iut.

After a total of 1.5 hours the reaction was completed. The ester-methanol mixture was then evaporated and analyzed.

760 g. of liquid produced in this distillation contained 18.4 wt.-percent $Si(OCH_3)_4$. The total yield with respect to silicon was therefore 78%.

EXAMPLE 8

50 g. of a fine-grained ferrosilicon containing 90 wt.-percent of silicon (grain diameter $10\mu$ and 1 kg. of a 38% potassium methylate solution were mixed with methanol in a 1 liter container provided with an agitator and a reflux condenser. The percentage data refers to the solution. Slight evolution of hydrogen began to take place at room temperature and increased during heating up to the reflux temperature amounting to approximately 200 l. $H_2$/hour. Toward the end of the reaction a total of 195 g. methanol had to be added in order to avoid the crystallization of the methylate. After 2 hours, the ester formation was substantially completed. The ester methanol mixture was distilled off and analyzed.

850 g. of liquid resulting from distillation contained 27 wt.-percent of orthosilicic acid tetramethyl ester. The yield of orthosilicic acid tetramethyl ester amounted to 100% with respect to the silicon which was converted to the extent of 95%; the total yield with respect to Si amounted to 95%.

EXAMPLE 9

Example 1 was repeated excepting that an 11% lithium methylate solution was used. The $H_2$ evolution amounted to, on an average, 10 l./h. and was almost completed after a running time of 8 hours. Toward the end of the reaction, 195 g. of methanol had to be added to avoid crystallization of lithium methylate. 926 g. of an ester methanol mixture, which contained 25% of orthosilicic acid tetramethyl ester, were recovered. The total yield amounted to 95%.

We claim:

1. Process of preparing orthosilicic acid tetramethyl esters comprising reacting at least one member selected from the group consisting of silicon, iron silicide and ferrosilicon with methanol in the presence of at least one member selected from the group consisting of sodium methylate, lithium methylate, potassium methylate, rubidium methylate and cesium methylate as catalyst, at a temperature of from about 15° C. up to the boiling point of the reaction mixture.

2. Process according to claim 1 which comprises conducting said reaction at normal pressure.

3. Process according to claim 1 which comprises forming said methylate group member in situ.

4. Process according to claim 3 wherein said group member is sodium methylate formed in situ by reaction of sodium with methanol.

5. Process according to claim 1 wherein said methanol is substantially anhydrous.

6. Process according to claim 1 wherein said methylate group member is utilized in an amount of from 5 to 38% referring to the amount of methanol.

7. Process according to claim 1 wherein said silicon containing group member is ferrosilicon containing 33 to 99% by weight of silicon.

8. Process according to claim 1 wherein said reaction is conducted under conditions producing comminution of the particles of said silicon containing group member.

9. Process according to claim 1 carried out continuously.

10. Process according to claim 1 wherein said methylate group member is sodium methylate.

11. Process according to claim 1 wherein said methylate group member is potassium methylate.

12. Process according to claim 1 wherein said methylate group member is lithium methylate.

References Cited

UNITED STATES PATENTS

| | | | |
|---|---|---|---|
| 2,389,931 | 11/1945 | Reed et al. | 260—448.8X |
| 2,473,260 | 6/1949 | Rochow | 260—448.8(A) |

TOBIAS E. LEVOW, Primary Examiner

P. F. SHAVER, Assistant Examiner.